United States Patent [19]

Suzuki et al.

[11] Patent Number: 5,073,047
[45] Date of Patent: Dec. 17, 1991

[54] OPTICAL SEMICONDUCTOR MODULE

[75] Inventors: Akinobu Suzuki; Yuji Sakazaki; Takeshi Nakamura, all of Kanagawa, Japan

[73] Assignee: Mitsubishi Denki Kabushiki Kaisha, Tokyo, Japan

[21] Appl. No.: 546,381

[22] Filed: Jun. 29, 1990

[30] Foreign Application Priority Data

Jul. 5, 1989 [JP] Japan .................................. 1-173202

[51] Int. Cl.⁵ .............................................. G02B 6/42
[52] U.S. Cl. ......................................... 385/93; 357/74
[58] Field of Search ............... 350/96.15, 96.18, 96.20, 350/96.21; 357/74

[56] References Cited

U.S. PATENT DOCUMENTS

| | | | |
|---|---|---|---|
| H551 | 12/1988 | Chaoui et al. | 350/96.20 |
| 4,779,947 | 10/1988 | Ito | 350/96.20 |
| 4,790,618 | 12/1988 | Abe | 350/96.15 |
| 4,803,689 | 2/1989 | Shibanuma | 350/96.20 X |
| 4,834,491 | 5/1989 | Aoki et al. | 350/96.20 |
| 4,875,752 | 10/1989 | Suzuki | 350/96.20 |

FOREIGN PATENT DOCUMENTS 63-18164  4/1988  Japan .

Primary Examiner—John D. Lee
Attorney, Agent, or Firm—Wolf, Greenfield & Sacks

[57] ABSTRACT

An optical semiconductor module which is connected to an optical fiber to introduce light from an optical semiconductor element into the optical fiber. The module comprises a holder which holds the semiconductor element, a housing which has a rod lens positioned therein and to which the holder is connected by fitting engagement made between one end of the housing and one end of the holder such that the optical axis of the semiconductor element and the optical axis of the rod lens coincide with each other, and a receptacle to which the optical fiber is connected, the receptacle being connected to the other end of the housing adjustably within a plane which perpendicularly intersects the optical axis of the optical fiber such that light from the semiconductor element that passes through the rod lens enters the optical fiber.

9 Claims, 2 Drawing Sheets

OPTICAL SEMICONDUCTOR MODULE

BACKGROUND OF THE INVENTION:

1. Field of the Invention

The present invention relates to an optical semi-conductor module for use, for example, in an optical communication system.

2. Description of the Prior Art

FIG. 2 is a sectional view of a typical coventional optical semiconductor module.

Referring to the figure, reference numeral 1 denotes a receptacle, and 2 an external thread which is provided on the receptacle 1. The external thread 2 is engaged with an internal thread 5 which is provided in a connecting nut 4 that constitutes an optical connector plug 3. The receptacle 1 is provided with a bore 6 along the central axis thereof for insertion of a ferrule 8 that retains an optical fiber 7. The receptacle 1 has a wall 9 that limits the depth to which the ferrule 8 is inserted, and further has a light passing bore 10. A rod lens 11 inserted into a bore 12 that is provided in the receptacle 1, and secured by means of a screw 13. A holder 14 has an optical semiconductor element 15 secured thereto by means, for example, of bonding. The holder 14 is secured to the receptacle 1 at a junction plane 16 by means, for example, of welding. It should be noted that when the rod lens 11 and the holder 14 are fixed, the position of the rod lens 11 must be adjusted in the same direction as the optical axis of the optical fiber 7, and the position of the holder 14 must be adjusted in a direction perpendicular to the optical axis of the optical fiber 7. The positional adjustment is effected by varying the degree to which the screw 13 is tightened.

The operation of the prior art will next be expained. The ferrule 8 is inserted into the bore 6, and the internal thread 5 is coupled with the external thread 2, thereby fitting the optical connector plug 3 to the receptacle 1. Thus, light that is emitted from the optical semiconductor element 15 is condensed through the rod lens 11 to enter the optical fiber 7 that is retained in the ferrule 8, thereby achieving optical coupling.

The conventional optical semiconductor module having the above-described arrangement suffers, however, from the following problems:

In adjustment of the position of the rod lens 11 in the same direction as the optical axis of the optical fiber 7, every time the rod lens 11 is moved by a very small amount for adjustment, it is necessary to remove the receptacle 1 from a fixing jig for assembly and retighten the screw 3. Thus, the prior art is inferior in terms of operating efficiency.

It is particularly difficult to align the respective optical axes of the optical semiconductor element 15 and the rod lens 11, and an angular displacement is very likely to occur in the process of securing the holder 14 to the receptacle 1. If an angulr displacement occurs, it is amplified through the rod lens 11. Accordingly, even if the angular displacement is very small, the light output from the rod lens 11 deviates by a large margin from the optical axis of the optical fiber 7. In consequence, the desired performance cannot be consistently obtained.

SUMMARY OF THE INVENTION

In view of the above-described problems of the prior art, it is an object of the present invention to provide an optical semiconductor module which has no need for the positional adjustment of the rod lens and hence necessitates the receptacle to be attached to a fixing jig only once, thereby improving the operating efficiency and minimizing the misalignment of the optical axes, and thus enabling the desired performance to be consistently obtained.

To this end, the present invention provides an optical semiconductor module which is connected to an optical cable to introduce laser light from a semiconductor light-emitting device into the optical cable, comprising: a holder which holds th semiconductor device; a housing which has a rod lens positioned therein and to which the holder is connected by fitting engagement that is made between one end of the housing and one end of the holder such that the optical axis of the semiconductor light-emitting device and the optical axis of the rod lens coincide with each other; and a connecting member to which the optical cable is connected, the connecting member being connected to the other of the housing adjustably within a plane which perpendicularly intersects the optical axis of the optical cable such that laser light from the semiconductor light-emitting device that passes through the rod lens enters the optical cable.

In the optical semiconductor module according to the present invention, the housing and the holder are joined together after positional adjustment has been effected in the same direction as the optical axis of an optical fiber serving as an optical cable, through sliding engagement portions of outer and inner cylinders, which are provided on the housing and the holder, respectively, and the housing and a receptacle serving as a connecting member, are joined together after positional adjustment has been effected in a direction perpendicular to the optical axis of the optical fiber along a junction plane that is defined between the housing and the receptacle. It is therefore possible to assemble the optical semiconductor module in such a manner as to achieve optimum optical coupling of the optical fiber and an optical semiconductor element, serving as a semiconductor light-emitting device.

BRIEF DESCIPTION OF THE DRAWINGS

The above and other objects, features and advantages of the present invention will become more apparent from the following description of the preferred embodiment thereof, taken in conjunction with the accompanying drawings, in which like reference numerals denote like elements, and of which:

FIG. 1 is a sectional view of one embodiment of the optical semiconductor module according to the present invention; and FIG. 2 is a sectional view of a conventional optical semiconductor module.

DESCRIPTION OF THE PREFERRED EMBODIMENT

Figure 1:
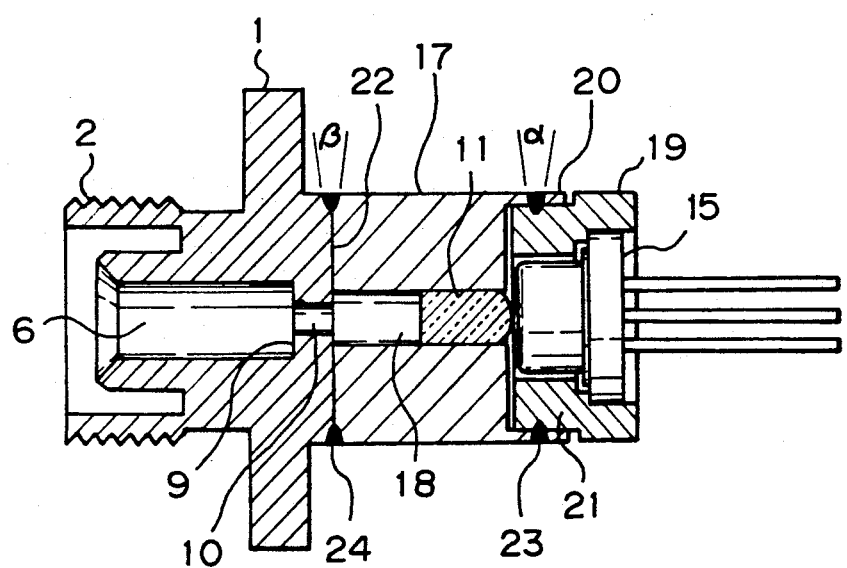
Figure 2:
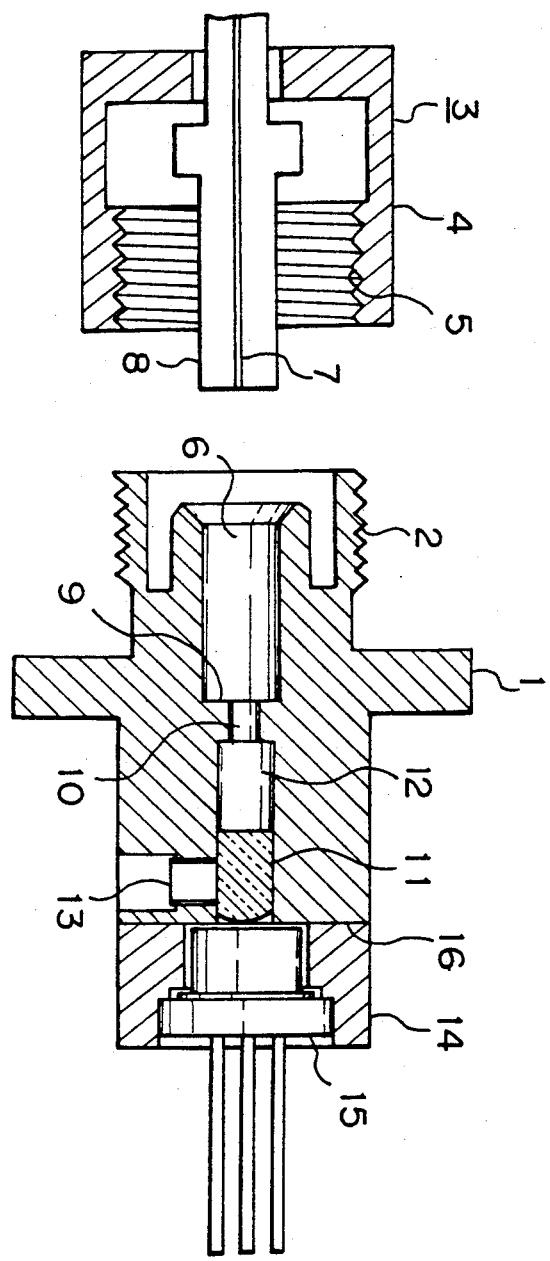

One embodiment of the present invention will be described below with reference to FIG. 1, which is a sectional view of the optical semiconductor module according to the present invention. In the figure, reference numerals 1, 2, 6, 9 to 11 and 15 denote the same members or portions as those in the prior art.

Reference numeral 17 denotes a housing which retains the rod lens 11 in a bore 18 by means, for example, of bonding, and 19 denotes a holder which retains the optical semiconductor element 15 by means, for example, of bonding. Between the housing 17 and the holder 19 are provided an outer cylinder 20 and an inner cylinder 21, which are slidably engaged with each other as if they were a cylinder and a piston. By fitting the outer cylinder 20 to the inner cylinder 21, the optical axis of the optical semiconductor element 15 in the holder 19 is aligned with the optical axis of the rod lens 11 in the housing 17. Thus, it is possible to readily effect the aligment of the respective optical axes of the optical semiconductor element 15 and the rod lens 11, which has heretofore been considerably complicated and troublesome. Reference numeral 22 denotes a junction plane that is defined between the receptacle 1 and the housing 17, the junction plane 22 being located within a plane that perpendicular intersects the optical axis of the optical fiber 7. The receptacle 1 and the housing 17 are adjusted relative to each other along the junction plane 22 so that light from the rod lens 11 is introduced into the optical fiber 7.

After the holder 19 has been fitted into the housing 17 and the position of the housing 17 has been adjusted along the junction plane 22 so as to achieve optimum optical coupling the optical fiber 7 and the optical semiconductor element 15, the housing 17 and the holder 19 are solidly welded together by means of a laser beam $\alpha$, and the receptacle 1 and the housing 17 are similarly welded together by means of a laser beam $\beta$. Reference numerals 23 and 24 denote fusion-welded portions that are formed by the laser beams $\alpha$ and $\beta$.

In the optical semiconductor module having the foregoing arrangment, the optical connector plug 3 is fitted to the receptacle 1, as stated above. Thus light that is emitted from the optical semiconductor element 15 is condensed through the rod lens 11 to enter the optical fiber 7 that is retained in the ferrule 8, thereby achieving optical coupling.

As has been described above, according to the present invention, the housing and the holder are joined together by means of a laser beam after positional adjustment has been effected in the same direction as the optical axis of the optical fiber through the sliding engagement portions of the outer and inner cylinders, which are provided on the housing and the holder, respectively, and the receptacle and the housing are joined together by means of a laser beam after positional adjustment has been effected in a direction perpendicular to the optical axis of the optical fiber along the junction plane that is defined between the receptacle and the housing. It is therefore possible to assemble the optical semiconductor module within an extremely short period of time. Even if a minute angular displacement occurs in the process of securing the housing to the receptacle, there is no possibility that the output light from the rod lens deviate by a large margin from the optical axis of the optical fiber. Accordingly, the desired performance can be consistently obtained.

Although the present invention has been described through specific terms, it should be noted here that the described embodiment is not necessarily exclusive and that various changes and modifications may be imparted thereto without departing from the scope of the invention which is limited solely by the appended claims.

I claim:

1. An optical semiconductor module which is connected to an optical cable to introduce laser light from a semiconductor light-emitting device into said optical cable, comprising:

a holder which holds said semiconductor light-emitting device;

a housing which has a rod lens positioned therein and to which said holder is connected by fitting engagement that is made between one end of said housing and one end of said holder such that the optical axis of said semiconductor light-emitting device and the optical axis of said rod lens coincide with each other; and a connecting member to which said optical cable is connected, said connecting member being connected to the other end of said housing adjustably within a plane which perpendicularly intersects the optical axis of said optical cable and is defined at the abutment between facing walls of said respective housing and connecting member such that laser light from said semiconductor light-emitting device that passes through said rod lens enters said optical cable, said holder, housing and connecting member being formed with substantially like diameter outer cylindrical walls; and first and second weld means, said first weld means providing retention of said holder and housing in said fitting engagement, said second weld means formed at the intersection of the abutment between the housing and connecting member and the substantially like diameter respective outer cylindrical walls of the housing and connecting member.

2. An optical semiconductor module according to claim 1, wherein the joint of said holder and said housing and the joint of said housing and said connecting member are welded by means of a laser beam.

3. An optical semiconductor module according to claim 1 wherein said connecting member comprises a receptacle, in combination with an optical connector plug.

4. An optical semiconductor module which is connected to an optical cable to introduce laser light from a semiconductor light-emitting device into said optical cable, comprising:

a holder which holds said semiconductor light-emitting device;

a housing which has a rod lens positioned therein and to which said holder is connected by fitting engagement that is made between one end of said housing and one end of said holder such that the optical axis of said semiconductor light-emitting device and the optical axis of said rod lens coincide with each other; and a connecting member to which said optical cable is connected, said connecting member being connected to the other end of said housing adjustably within a plane which perpendicularly intersects the optical axis of said optical cable such that laser light from said semiconductor light-emitting device that passes through said rod lens enters said optical cable, the facing walls of the housing and connecting member each being of substantially like outer diameter, said housing and connecting member having substantially like diameter outer cylindrical walls adjacent said respective facing walls; and a first weld means formed at the intersection of the abutment between the housing and connecting member and the substantially like diameter respective outer cylindrical walls of the housing and connecting member.

5. An optical semiconductor module as set forth in claim 4, wherein said holder, housing and connecting member are all formed with at least segments thereof of substantially like diameter outer cylindrical walls, and second weld means providing retention of said holder and housing in said fitting engagement.

6. A method of aligning the respective optical axes of a semiconductor element and an optical cable element of an optical semiconductor module, comprising the steps of:

provnotifying a housing having a first cylindrical end thereof and a second end, said housing including a rod lens positioned therein;

providing a holder having a first cylindrical end thereof and a second end, said holder including a semiconductor light-emitting device positioned therein;

engaging the first cylindrical end of the housing with the first cylindrical end of the holder;

positionally adjusting said first end of the housing and the holder in the direction of the optical axis of the rod lens and semiconductor device;

welding the first end of the housing and the holder together;

providing a connecting member for supporting an optical cable;

positionally adjusting the connecting member and the second end of the housing in a direction perpendicular to the optical axis of the optical cable along the junction plane that is defined between the connecting member and housing;

welding the second end of the housing to the connecting member.

7. The method according to claim 6, wherein in the steps of providing said holder, housing and connecting member, said holder, housing, and connecting member have substantially like diameter outer cylindrical walls.

8. The method according to claim 7, wherein the steps of welding include welding at the abutment between facing walls of said respective housing, holder, and connecting member.

9. A method according to claim 8, wherein the steps of welding are accomplished by means of a laser beam.

* * * * *